(12) United States Patent
Heo

(10) Patent No.: US 12,489,295 B2
(45) Date of Patent: Dec. 2, 2025

(54) METHOD, DEVICE, AND SYSTEM FOR MANAGING CHARGE AND DISCHARGE OF ESS GROUP FOR VOLTAGE STABILIZATION OF SYSTEM HAVING DISTRIBUTED POWER SUPPLY CONNECTED THERETO

(71) Applicant: AEONUS CO., LTD, Suwon-si Gyeonggi-do (KR)

(72) Inventor: Eun Heo, Yongin-si Gyeonggi-do (KR)

(73) Assignee: AEONUS CO., LTD, Suwon-si (KR)

( * ) Notice: Subject to any disclaimer, the term of this patent is extended or adjusted under 35 U.S.C. 154(b) by 454 days.

(21) Appl. No.: 17/928,304

(22) PCT Filed: May 25, 2021

(86) PCT No.: PCT/KR2021/006512
§ 371 (c)(1),
(2) Date: Jan. 5, 2023

(87) PCT Pub. No.: WO2021/241989
PCT Pub. Date: Dec. 2, 2021

(65) Prior Publication Data
US 2023/0216303 A1 Jul. 6, 2023

(30) Foreign Application Priority Data
May 29, 2020 (KR) .................. 10-2020-0064662

(51) Int. Cl.
*H02J 3/32* (2006.01)
*H02J 3/00* (2006.01)
(Continued)

(52) U.S. Cl.
CPC ............ *H02J 3/32* (2013.01); *H02J 3/003* (2020.01); *H02J 3/004* (2020.01); *H02J 3/381* (2013.01);
(Continued)

(58) Field of Classification Search
CPC .... Y02B 70/3225; Y04S 20/222; H02J 3/144; H02J 2300/40
See application file for complete search history.

(56) References Cited

U.S. PATENT DOCUMENTS

2010/0208501 A1* 8/2010 Matan ................. H02J 3/46
700/297
2012/0242148 A1* 9/2012 Galati ................. H02J 3/28
307/39
(Continued)

FOREIGN PATENT DOCUMENTS

CN 111725823 A * 9/2020 ............. H02J 3/008
KR 10-2011-0124776 A 11/2011
(Continued)

*Primary Examiner* — Mohammad Ali
*Assistant Examiner* — Dhruvkumar Patel
(74) *Attorney, Agent, or Firm* — NKL Law; Jae Youn Kim

(57) ABSTRACT

Provided is a method, device, and system capable of performing control so that the voltage of a grid to which a distributed resource is connected is decreased through charging of an ESS group, performing control so that the voltage of the grid to which the distributed resource is connected is increased through discharging of the ESS group, calculating a voltage control amount through a charge amount and a discharge amount for each ESS group when the voltage of the grid to which the distributed resource is connected is stabilized, and providing a performance incentive for voltage stabilization based on the voltage control amount.

1 Claim, 6 Drawing Sheets

(51) Int. Cl.
*H02J 3/38* (2006.01)
*H02J 7/00* (2006.01)

(52) U.S. Cl.
CPC ........ *H02J 7/0063* (2013.01); *H02J 7/00714* (2020.01); *H02J 7/007182* (2020.01); *H02J 2203/10* (2020.01)

(56) References Cited

U.S. PATENT DOCUMENTS

| | | | |
|---|---|---|---|
| 2021/0028625 A1* | 1/2021 | Inoue | H02J 3/32 |
| 2021/0143643 A1* | 5/2021 | Park | H02J 3/16 |

FOREIGN PATENT DOCUMENTS

| | | | | |
|---|---|---|---|---|
| KR | 101945501 B1 * | 2/2019 | | |
| KR | 10-1977165 B1 | 5/2019 | | |
| KR | 10-2019-0089289 A | 7/2019 | | |
| KR | 10-2232931 B1 | 3/2021 | | |
| WO | WO-2019151656 A1 * | 8/2019 | ................ | H02J 3/28 |

\* cited by examiner

METHOD, DEVICE, AND SYSTEM FOR MANAGING CHARGE AND DISCHARGE OF ESS GROUP FOR VOLTAGE STABILIZATION OF SYSTEM HAVING DISTRIBUTED POWER SUPPLY CONNECTED THERETO

TECHNICAL FIELD

The following embodiments relate to a technology for managing charging and discharging of an ESS group for voltage stabilization of a grid having a distributed resource connected thereto.

BACKGROUND ART

In the power grid, load demand is not constant and difficult to accurately predict, and thus, an imbalance between power demand and supply may occur. In order to adjust the imbalance in power supply and demand, FR operators who adjust frequency and VR operators who control voltage may adjust the imbalance in power supply and demand by consuming or producing power, and an incentive may be provided according to the adjustment.

In recent years, distributed resources using solar power and wind power have been actively used, but since the lighting rate and wind vary depending on the changed weather, power production is not uniform, which may lead to a problem in that continuous voltage control is required.

Meanwhile, an ESS, which stands for energy storage system, refers to a storage device that stores excessively produced power from a power plant and transmits the stored power when there is a temporary power shortage. The ESS includes a battery that stores electricity and related components such as a power conditioning system (PCS), an energy management system (EMS), and a battery management system (BMS) for efficiently managing the battery.

With the increased demand for electricity year by year due to industrial development, the amount of electricity used by consumers also tends to increase. However, increasing power production facilities has significant limitations in reality. Accordingly, in the effort to save energy, policies to encourage and support the installation of ESS for various consumers such as individual houses, apartment houses, office space, and factory facilities are continuously being promoted.

However, ESS construction not only takes a lot of money, but also has various and complex problems with the necessary components such as a battery, PCS, EMS, and BMS, and as a consequence, it is burdensome for consumers to install the ESS on their own.

In addition, since power consumption and usage patterns differ depending on the characteristics of the installation location, such as a house or a factory facility, there is a demand for efficient management and power supply control to maximize the utilization effect by customer and the energy saving effect by the entire system after the ESS construction.

Therefore, there is an increasing demand to manage charging and discharging of the ESS as well as to control the voltage of a grid to which a distributed resource is connected.

DISCLOSURE OF THE INVENTION

Technical Problem

The present invention has been made to solve the above-mentioned problems of the related art, and provides a method and device capable of performing control so that the voltage of a grid to which a distributed resource is connected is decreased through charging of an ESS group, performing control so that the voltage of the grid to which the distributed resource is connected is increased through discharging of the ESS group, calculating a voltage control amount through a charge amount and a discharge amount for each ESS group when the voltage of the grid to which the distributed resource is connected is stabilized, and providing a performance incentive for voltage stabilization based on the voltage control amount.

The object of the present invention is not limited to the object mentioned above, and other objects not mentioned will be clearly understood from the description below.

Technical Solution

According to an embodiment of the present invention, there is provided a method for managing charging and discharging of an energy storage system (ESS) group for voltage stabilization of a grid having a distributed resource connected thereto in a power management device, the method including: measuring a voltage and current amount of the grid to which the distributed resource is connected; performing control so that a voltage of the grid to which the distributed resource is connected is reduced through charging of an ESS group to be charged, by determining that a plurality of ESSs connected to a power distribution line are required to be charged when it is confirmed that the voltage and current amount of the grid to which the distributed resource is connected are greater than a preset reference voltage and current amount, calculating a required charge amount through a difference between the voltage and current amount of the grid to which the distributed resource is connected and the reference voltage and current amount, checking the chargeable capacity for each of ESS groups in which the plurality of ESSs are classified according to a preset condition, selecting the ESS group to be charged from among the ESS groups based on the required charge amount and the chargeable capacity for each ESS group, and transmitting a charging command for the required charge amount to the ESS group to be charged; performing control so that the voltage of the grid to which the distributed resource is connected is increased through charging of an ESS group to be discharged, by determining that the plurality of ESSs are required to be discharged when it is confirmed that the voltage and current amount of the grid to which the distributed resource is connected are smaller than the reference voltage and current amount, calculating a required discharge amount through the difference between the voltage and current amount of the grid to which the distributed resource is connected and the reference voltage and current amount, checking the dischargeable capacity for each of the ESS groups, selecting the ESS group to be discharged from among the ESS groups based on the required discharge amount and the dischargeable capacity for each ESS group, and transmitting a discharging command for the required discharge amount to the ESS group to be discharged; calculating a voltage control amount through a charge amount and a discharge amount for each ESS group when the voltage of the grid to which the distributed resource is connected is stabilized by charging and discharging the plurality of ESSs; and providing a performance incentive for voltage stabilization to the ESS group in which it is confirmed that the voltage control amount is greater than or equal to a reference value according to the voltage control amount and providing a maintenance incentive for standby in an emergency situation to an ESS group in which it is confirmed that the voltage control amount is less than the reference value.

The calculating of the voltage control amount may include: setting a first weight according to a magnitude of the difference between the voltage and current amount of the grid to which the distributed resource is connected and the reference voltage and current amount, the difference being checked at a time of charging and discharging; setting a second weight according to a sum of the chargeable capacity and dischargeable capacity for each ESS group, the chargeable capacity and the dischargeable capacity being checked at the time of charging and discharging; and calculating the voltage control amount by applying the first weight and the second weight to the charge amount and discharge amount of the ESS group.

The method may further include: predicting a power supply amount through a sum of power generation amounts obtained by collecting meteorological data for a power supply region where the plurality of distributed resources are located and calculating a power generation amount for each of the plurality of distributed resources based on the meteorological data; predicting a power demand amount based on power use data and the meteorological data, the power use data being collected by weather in a power consuming region where a load connected to the power distribution line is located; evaluating stabilization of power supply and demand by comparing the predicted power supply amount and the predicted power demand amount; and determining the number of ESS groups to be set as participants for voltage stabilization of the grid to which the distributed resource is connected from among the plurality of ESSs, according to a result of the evaluating of the stabilization of power supply and demand.

The predicting of the power demand amount may include: acquiring voluntary evaluation information, involuntary evaluation information, and sales information about a festival in the power consuming region from users related to the festival within a predetermined period of time; generating a first input signal based on the voluntary evaluation information, generating a second input signal based on the involuntary evaluation information, and generating a third input signal based on the sales information; inputting the first input signal, the second input signal, and the third input signal to previously trained neural networks; acquiring a first output signal and a second output signal based on a result of the inputting to the neural networks; and predicting the power demand amount for the festival in the power consuming region based on the first output signal and the second output signal, the neural networks may include a first neural network using the first input signal as an input; a second neural network using, as inputs, first scale evaluation information for the first input signal that is sorted according to classification of the first neural network, second scale evaluation information for the second input signal, and the sales information for the third input signal; and a third neural network using, as inputs, first content evaluation information for the first input signal that is sorted according to the classification of the first neural network, second content evaluation information for the second input signal, and the sales information for the third input signal, the first input signal may be a vector of one row and thirty columns in which an existing entire sentence constituting the voluntary evaluation information is included in a first column of a first row, a first classification word implying explicit information is selected, a classification criterion word is selected as a second classification word from among words corresponding to others when the classification criterion word is included before and after the words in the entire sentence included in the first column of the first row, the first classification word and the second classification word are arranged in a second column to a 30th column, and 'X' is included in columns where the first classification word and the second classification word are not input in the thirty columns, and the first neural network may classify words in the first input signal into the first scale evaluation information and the first content evaluation information.

The second neural network may use, as inputs, the first scale evaluation information according to the classification of the first neural network—when 1000 words for the first scale evaluation information are collected, they are arranged in the respective columns of the vector of one row so that they are arranged in the first column to the 1000th column-, the second scale evaluation information for the second input signal—the second scale evaluation information is generated based on responses to seven questions regarding the scale of the festival from the involuntary evaluation information, and is arranged in the 1001th column to the 1700th column whenever it is collected in units of 100 persons in total-, and the sales information for the third input signal, and may output the first output signal having size information for the festival as five output values according to the scale based on 1,700 input values corresponding to the respective columns, and the third neural network may use, as inputs, the first content evaluation information according to the classification of the first neural network—when 1000 words for the first content evaluation information are collected, they are arranged in respective columns of the vector of one row so that they are arranged in the first column to the 1000th column-, the second content evaluation information for the second input signal—the second content evaluation information is generated based on responses to three questions regarding the content of the festival from the involuntary evaluation information, and is arranged in the 1001th column to the 1300th column whenever it is collected in units of 100 persons in total-, and the sales information for the third input signal, and may output the second output signal including type information regarding the festival—the type information includes a code indicating the type of the festival, and the code is a code combined from four output values-based on 1,300 input values corresponding to respective columns.

Advantageous Effects

According to an embodiment of the present invention, it is possible to perform control so that the voltage of the grid to which a distributed resource is connected is decreased through charging of the ESS group, perform control so that the voltage of the grid to which the distributed resource is connected is increased through discharging of the ESS group, calculate the voltage control amount through the charge amount and discharge amount for each ESS group when the voltage of the grid to which the distributed resource is connected is stabilized, and provide a performance incentive for voltage stabilization based on the voltage control amount, thereby making it possible to manage ESSs in group units and provide the incentive for each group, which produces the effect of easily controlling the voltage of the grid to which the distributed resource is connected as well as managing charging and discharging of the ESSs.

Meanwhile, effects according to the embodiments are not limited to those mentioned above, and other effects not

REFERENCE SIGNS LIST

Figure 1:
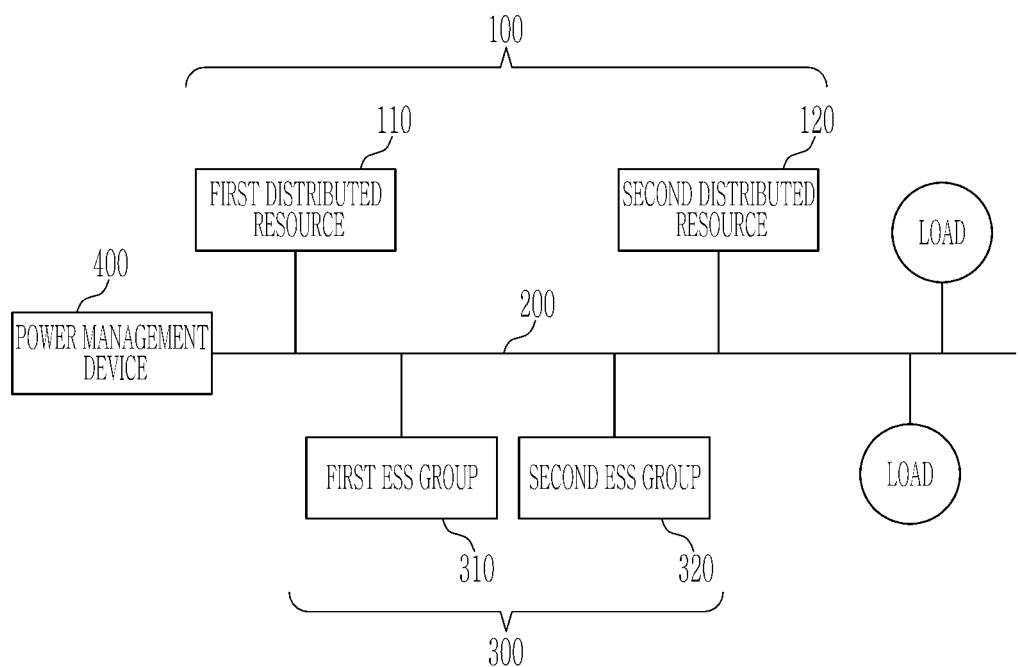
FIG. 1 is a diagram schematically showing a configuration of a system for providing a method for managing charging and discharging of energy storage system (ESS) groups for voltage stabilization of a grid to which distributed resources are connected, according to an embodiment of the present invention.

100: Plurality of distributed resources: 110: First distributed resource
120: Second distributed resource 200: Power distribution line
300: Plurality of ESSs 310: First ESS Group
320: Second ESS Group 400: Power management device
2010: First input signal 2020: Second input signal
2030: Third input signal 2110: Voluntary evaluation Information
2120: First classification word 2130: Second classification word
2140: First scale evaluation information 2150: First content evaluation information
2200: Questionnaire 2210: Involuntary evaluation information
2220: Second scale evaluation information 2230: Second content evaluation information
2310: Sales information 3010: First neural network
3020: Second neural network 3030: Third neural network
3100: First output signal 3200: Second output signal

MODE FOR CARRYING OUT THE INVENTION

Hereinafter, embodiments will be described in detail with reference to the drawings. However, various alterations and modifications may be made to the embodiments, and it should be understood that the technical scope of the present invention is not limited or restricted to the contents of the embodiments. It should be understood that all modifications, equivalents, and substitutes can be made without departing from the spirit and scope of the present disclosure.

The specific structural or functional descriptions are exemplary to merely describe the examples, and can be changed and carried out in various forms. The embodiments are not limited to the forms disclosed in the present disclosure, and include modifications, equivalents, or substitutes within the technical spirit of the present disclosure.

Terms such as first or second may be used to describe various elements, but the terms are to be interpreted only for the purpose of distinguishing one element from another element. For example, a first element may be termed a second element, and similarly, a second element may also be termed a first element.

It will be understood that when an element is referred to as being "connected" to another element, the element may be directly coupled or connected to the other element, or intervening elements may also be present.

The terms used in the embodiments are used for descriptive purposes only and should not be construed as limiting. The singular forms, "a", "an", and "the" are intended to include the plural forms as well, unless the context clearly indicates otherwise. In the present disclosure, it will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein, including technical or scientific terms, have the same meaning as commonly understood by those of ordinary skill in the art to which the embodiments pertain. Terms, such as those defined in commonly used dictionaries, should be interpreted as having a meaning that is consistent with their meaning in the context of the related art and will not be interpreted in an idealized or overly formal sense unless expressly so defined herein.

In addition, in the description with reference to the accompanying drawings, identical components are denoted by the same reference numerals regardless of figure signs, and redundant descriptions thereof will be omitted. In describing embodiments, when it is determined that detailed descriptions of related known technology may unnecessarily obscure the gist of the disclosed embodiments, the detailed descriptions thereof will be omitted.

FIG. 1 is a diagram schematically showing a configuration of a system for providing a method for managing charging and discharging of energy storage system (ESS) groups for voltage stabilization of a grid to which distributed resources are connected, according to an embodiment of the present invention.

Referring to FIG. 1, a system according to an embodiment of the present invention may include a plurality of distributed resources 100, a power distribution line 200, a plurality of ESSs 300, and a power management device 400.

The plurality of distributed resources 100 may include a first distributed resource 110, a second distributed resource 120, and the like, and power may be generated in different ways for each distributed resource.

For example, the first distributed resource 110 may generate power through wind power generation, and the second distributed resource 120 may generate power through photovoltaic power generation.

The power distribution line 200 may connect a plurality of distributed resources 100, a plurality of ESSs 300, and a power management device 400 to each other so that power is supplied.

Although not shown in FIG. 1, various devices such as substations and loads may be connected to the power distribution line 200, and the power distribution line 200 may process power to be supplied to the connected devices. Embodiments mainly focus on the power distribution line 200, but are not limited thereto and may be extended and applied to a power transmission line, for example.

The plurality of ESSs 300 may be classified into ESS groups according to preset conditions, and may be classified into a first ESS group 310, a second ESS group 320, and the like.

For example, the plurality of ESSs 300 may be classified into the first ESS group 310, the second ESS group 320, and the like, according to the region of the ESS location, and may be classified into the first ESS group 310, the second ESS group 320, and the like, according to the type of ESS device.

The power management device 400 may function as a substation, and may manage charging and discharging of a plurality of ESSs 300 for each ESS group for voltage stabilization of a grid to which a plurality of distributed resources 100 are connected.

Figure 2:
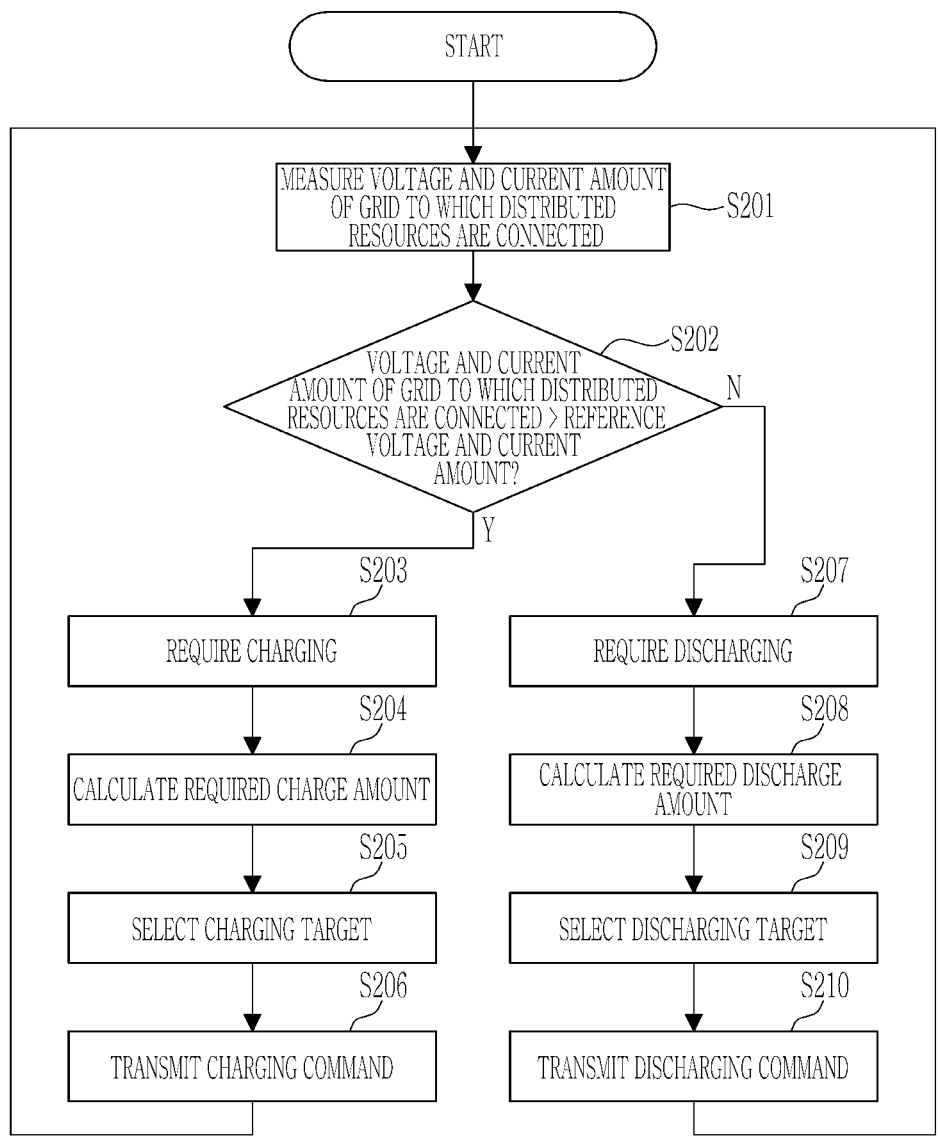
FIG. 2 is a flowchart illustrating a process of stabilizing the voltage of the grid to which distributed resources are connected through charging and discharging of the ESS groups, according to an embodiment of the present invention.

FIG. 2 is a flowchart illustrating a process of stabilizing the voltage of the grid to which distributed resources are connected through charging and discharging of the ESS groups, according to an embodiment of the present invention.

In step S201, the power management device 400 may measure a voltage and current amount of the grid to which the plurality of distributed resources 100 are connected. According to an embodiment, the power management device 400 may measure the voltage and current amount of each of the plurality of distributed resources 100 connected to the power distribution line 200. The power management device 400 may measure the voltage and current amount of the grid to which the plurality of distributed resources 100 are connected based on the voltage and current amount of each of the plurality of distributed resources 100. The power management device 400 may measure the voltage and current amount of the grid to which the plurality of distributed resources 100 are connected by utilizing the power distribution line 200, and the method for measuring the voltage and current amount of the grid to which the plurality of distributed resources 100 are connected is not limited thereto, and various techniques may be employed.

In step S202, the power management device 400 may compare the voltage and current amount of the grid to which the plurality of distributed resources 100 are connected with a reference voltage and current amount, and may determine which voltage and current amount is greater. Here, the reference voltage and current amount may be set in advance by a manager, and may be set differently depending on a state of the grid to which the plurality of distributed resources 100 are connected or each of the plurality of distributed resources 100.

According to an embodiment, the power management device 400 may compare the voltage and current amount of the first distributed resource 110 with the reference voltage and current amount, and compare the voltage and current amount of the second distributed resource 120 with the reference voltage and current amount. In this way, the power management device 400 may stabilize the voltage by performing targeting for each distributed resource. The target of voltage stabilization may be set in various ways according to system design intention or requirements. Among the embodiments, an embodiment in which a grid to which a plurality of distributed resources 100 are connected is a target for voltage stabilization will be mainly described below.

When it is confirmed in step S202 that the voltage and current amount of the grid to which the plurality of distributed resources 100 are connected are greater than the reference voltage and current amount, in step S203, the power management device 400 may determine that the plurality of ESSs 300 connected to the power distribution line 200 are required to be charged.

In step S204, the power management device 400 may calculate a required charge amount through a difference between the voltage and current amount of the grid to which the plurality of distributed resources 100 are connected and the reference voltage and current amount.

For example, the power management device 400 may calculate the required charge amount as 10 Wh when the difference between the voltage of the grid to which the plurality of distributed resources 100 are connected and the reference voltage is 10 V, and may calculate the required charge amount as 5 Wh when the difference between the voltage of the grid to which the plurality of distributed resources 100 are connected and the reference voltage is 5 V.

In step S205, the power management device 400 may select an ESS group to be charged from among the plurality of ESSs 300.

Specifically, the power management device 400 may check the chargeable capacity of the first ESS group 310 and the chargeable capacity of the second ESS group 320, and may select an ESS group to be charged from the plurality of ESSs 300 based on the required charge amount and the chargeable capacity of each ESS group calculated in step S204.

For example, when the chargeable capacity of the first ESS group 310 is 10 Wh, the chargeable capacity of the second ESS group 320 is 5 Wh, and the required charge amount is 10 Wh, the power management device 400 may select the first ESS group 310 as the ESS group to be charged.

In step S206, the power management device 400 may transmit a charging command for the required charge amount to the first ESS group 310 selected as the target ESS group to be charged, thereby performing control so that the voltage of the grid to which the plurality of distributed resources 100 are connected is reduced through the charging of the first ESS group 310.

Meanwhile, when it is confirmed in step S202 that the voltage and current amount of the grid to which the plurality of distributed resources 100 are connected are smaller than the reference voltage and current amount, in step S207, the power management device 400 may determine that the plurality of ESS 300s connected to the power distribution line 200 are required to be discharged.

In step S208, the power management device 400 may calculate a required discharge amount through the difference between the voltage and current amount of the grid to which the plurality of distributed resources 100 are connected and the reference voltage and current amount.

For example, the power management device 400 may calculate the required discharge amount as 10 Wh when the difference between the voltage of the grid to which the plurality of distributed resources 100 are connected and the reference voltage is 10 V, and may calculate the required discharge amount as 5 Wh when the difference between the voltage of the grid to which the plurality of distributed resources 100 are connected and the reference voltage is 5 V.

In step S209, the power management device 400 may select an ESS group to be discharged from among the plurality of ESSs 300.

Specifically, the power management device 400 may check the dischargeable capacity of the first ESS group 310 and the dischargeable capacity of the second ESS group 320, and may select an ESS group to be charged from the plurality of ESSs 300 based on the required discharge amount and the dischargeable capacity of each ESS group calculated in step S204.

For example, when the dischargeable capacity of the first ESS group 310 is 10 Wh, the dischargeable capacity of the second ESS group 320 is 5 Wh, and the required discharge amount is 10 Wh, the power management device 400 may select the first ESS group 310 as the ESS group to be discharged.

In step S210, the power management device 400 may transmit a discharging command for the required discharge amount to the first ESS group 310 selected as the target ESS group to be discharged, thereby performing control so that the voltage of the grid to which the plurality of distributed resources 100 are connected is increased through the discharging of the first ESS group 310.

When the voltage of the grid to which the plurality of distributed resources 100 are connected is stabilized by charging and discharging of the plurality of ESSs 300, the power management device 400 may check the charge amount and discharge amount for each ESS group and determine the voltage control amount through the charge amount and discharge amount.

For example, the power management device 400 may calculate the voltage control amount as 5 V when the charge amount of the first ESS group 310 is 5 Wh, and calculate the voltage control amount as 10 V when the discharge amount of the first ESS group 310 is 10 Wh.

In calculating the voltage control amount, the power management device 400 may check the difference between the voltage and current amount of the grid to which the plurality of distributed resources 100 are connected and the reference voltage and current amount at the time of charging and discharging, and set a first weight according to the magnitude of the checked difference between the voltage and current amounts.

For example, the power management device 400 may set the first weight to 1.5 when it is confirmed that the difference between the voltage of the grid to which the plurality of distributed resources 100 are connected and the reference voltage is 15 V when the first ESS group 310 is performing charging, set the first weight to 1 when it is confirmed that the difference between the voltage of the grid to which the plurality of distributed resources 100 are connected and the reference voltage is 10, and set the first weight to 0.5 when it is confirmed that the difference between the voltage of the grid to which the plurality of distributed resources 100 are connected and the reference voltage is 5 V.

That is, as the difference between the voltage and current amount of the grid to which the plurality of distributed resources 100 are connected and the reference voltage and current amount at the time of charging and discharging increases, the first weight may be set to a higher value.

In calculating the voltage control amount, the power management device 400 may check the chargeable capacity and dischargeable capacity for each ESS group at the time of charging and discharging, and set a second weight according to a sum of the checked chargeable capacity and dischargeable capacity.

For example, the power management device 400 may check the chargeable capacity of the first ESS group 310 and the chargeable capacity of the second ESS group 320 when the first ESS group 310 is performing charging, set the second weight to 1.5 when it is confirmed that the sum of the chargeable capacity of the first ESS group 310 and the chargeable capacity of the second ESS group 320 is 5 Wh, set the second weight to 1 when it is confirmed that the sum of the chargeable capacity of the first ESS group 310 and the chargeable capacity of the second ESS group 320 is 10 Wh, and set the second weight to 0.5 when it is confirmed that the sum of the chargeable capacity of the first ESS group 310 and the chargeable capacity of the second ESS group 320 is 15 Wh.

That is, the second weight may be set to a higher value as the sum of the chargeable capacity and the dischargeable capacity for each ESS group decreases at the time of charging and discharging.

The power management device 400 may calculate the voltage control amount by applying the first weight and the second weight to the charge amount and the discharge amount, respectively, in calculating the voltage control amount through the charge amount and discharge amount for each ESS group.

Figure 3:
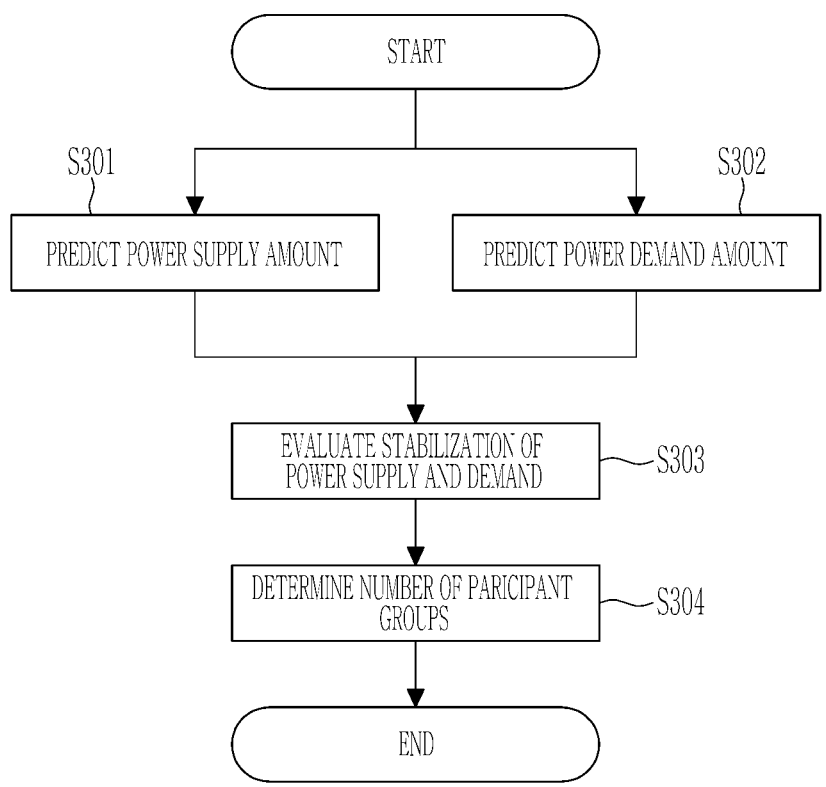
FIG. 3 is a flowchart illustrating a process of determining the number of participant groups for voltage stabilization of the grid to which distributed resources are connected, according to an embodiment of the present invention.

FIG. 3 is a flowchart illustrating a process of determining the number of participant groups for voltage stabilization of the grid to which distributed resources are connected, according to an embodiment of the present invention.

First, in step S301, the power management device 400 may predict a power supply amount through a sum of power generation amounts obtained by collecting meteorological data for a power supply region where the plurality of distributed resources 100 are located and calculating a power generation amount for each of the plurality of distributed resources 100 based on the meteorological data.

For example, the power management device 400 may check the amount of sunlight from the meteorological data to calculate the power generation amount for the first distributed resource 110 through the amount of sunlight, may check the amount of airflow from the meteorological data to calculate the power generation amount for the second distributed resource 120 through the amount of airflow, and may predict the power supply amount through the sum of the power generation amounts of the first distributed resource 110 and the second distributed resource 120.

In step S302, the power management device 400 may collect power use data by weather in a power consumption region where a load connected to the power distribution line 200 is located, and may predict a power demand amount based on the power use data and meteorological data.

For example, when the weather is predicted to be clear in the future through meteorological data, the power management device 400 may predict the power demand amount by checking the power use amount on a day of clear weather from the power use data by weather.

In step S303, the power management device 400 may evaluate stabilization of power supply and demand by comparing the power supply amount predicted in step S301 with the power demand amount predicted in step S302.

In step S304, the power management device 400 may determine the number of ESS groups to be set as participants for voltage stabilization of the grid to which the plurality of distributed resources 100 are connected from among the plurality of ESSs 300, according to a result of the evaluating of the stabilization of power supply and demand.

Specifically, when, as a result of comparing the predicted power supply amount to the predicted power demand amount, it is confirmed that the difference between the power supply amount and the power demand supply is greater than or equal to a reference value and the stabilization of the power supply and demand is evaluated as dangerous, the power management device 400 may increase the number of participant ESS groups.

In addition, when, as the result of comparing the predicted power supply amount to the predicted power demand amount, it is confirmed that the difference between the power supply amount and the power demand supply is less than the reference value and the stabilization of the power supply and demand is evaluated as stable, the power management device 400 may decrease the number of participant ESS groups.

Meanwhile, in predicting the power demand amount, the power management device 400 may acquire voluntary evaluation information, involuntary evaluation information, and sales information about a festival in the power consuming region from users related to the festival within a predetermined period of time, and may generate a first input signal based on the voluntary evaluation information, generate a second input signal based on the involuntary evaluation information, and generate a third input signal based on the sales information.

The power management device 400 may input the first input signal, the second input signal, and the third input signal to previously trained neural networks, and may acquire a first output signal and a second output signal based on a result of the inputting to the neural networks.

The power management device 400 may predict the power demand amount for the festival in the power consuming region based on the first output signal and the second output signal.

The voluntary evaluation information according to an embodiment may be generated through processes of controlling an automatic search tool in an embedded computer of the power management device 400 to search for and acquire sentences related to the festival in the power consuming region on search portal sites, blogs, and SNS, and then processing the sentences by itself. Sentences related to the festival in the power consuming region may include all text within the page including the name of the festival. The automatic search tool may repeat the search task at a fixed time on a daily basis, and a page with the same address as a the page previously visited may not be viewed again.

According to an embodiment, the power management device 400 may undergo the process of processing acquired sentences by itself. The power management device 400 may classify acquired sentences in modified word units. The modified word units are obtained basically through the classification based on the grammatical word units, that is, spacings; however, when a word is an adverb or an unconjugated adjective as a result of searching the database which has been stored in the control device in advance, the classification may be performed so that the word is notated together with the following adverb, unconjugated adjective, interjection, adjective, and verb. For example, 'delicious cake' is divided into 'delicious' and 'cake' in the existing word units, but since 'delicious' is an unconjugated adjective that has been stored in the database in advance, 'delicious cake' may be seen as one unit. For example, in the case of expressions of 'so delicious cake' or 'surprisingly very pretty cake', 'so' is an adverb, and is coupled with the unconjugated adjective 'delicious' that follows it, and 'delicious' is also an unconjugated adjective, and as a result, 'so delicious cake' may be seen as one unit. Likewise, in 'surprisingly very pretty cake', 'surprisingly' is an adverb and is coupled with 'very' that follows it, 'very' is also an adverb and is coupled with 'pretty', and the word 'pretty' is also an unconjugated adjective and is coupled with 'cake', and as a result, 'surprisingly very pretty cake' may be recognized as a single word in the modified word units.

According to an embodiment, the power management device 400 may remove postpositions in words classified in modified word units. Types of postpositions may include, but are not limited to, -eun, -neun, -i, -ga, or the like. The type of postpositions may be stored in the database in advance. The power management device 400 may assign the number of repetitions to the right side of the words of the modified word unit from which the postposition is removed as the words are repeated. For example, in the sentence 'This chiffon cake has delicious bread, delicious toppings, delicious cream, and a beautiful design', the word 'delicious' appears three times in total, and so in this case, the word that has appeared three times may be organized as 'delicious3'.

The involuntary evaluation information according to an embodiment will be acquired by a customer, who has subscribed to a customer management system and has visited the festival, providing subscription information at checkout, as a result of the customer's response to a questionnaire sent to the customer after completion of the checkout. A festival manager may provide a reward for increasing the response rate of the questionnaire about the festival; such a reward may include, but is not limited to, a discount coupon, a drink coupon, and a prize lottery ticket.

According to an embodiment, the questionnaire for acquiring involuntary evaluation information may consist of a total of ten questions, among which seven evaluation questions regarding the scale of the festival and three evaluation questions regarding the content of the festival may be included. When a customer who has subscribed to the customer management system visits again, +0.3 points may be added to the average of each evaluation factor in the survey result of the questionnaire above.

Sales information according to an embodiment may be a value including weekly sales details of affiliated stores participating in the festival. Sales may refer to all sales generated during the festival, and may include both card sales and cash sales. Sales may be automatically settled when customers visiting the festival purchase items using a point of sales (POS) device.

According to an embodiment, the power management device 400 may generate a first input signal based on voluntary evaluation information, generate a second input signal based on involuntary evaluation information, and generate a third input signal based on sales information.

According to an embodiment, the power management device 400 may generate input signals based on the voluntary evaluation information, the involuntary evaluation information, and the sales information, and the input signals may be used as inputs of neural networks. A detailed description of the generation of the first input signal, the second input signal, and the third input signal will be described later with reference to FIGS. 4 and 5.

According to an embodiment, the power management device 400 may input the first input signal, the second input signal, and the third input signal to the pretrained neural networks of embedded computers in the power management device 400.

According to an embodiment, the power management device 400 may input the first input signal to a first neural network, and some or all of the second and third input signals to both second and third neural networks. A detailed description of neural networks will be described later with reference to FIG. 6.

According to an embodiment, the power management device 400 may acquire the first output signal and the second output signal based on a result of the input, and predict the power demand amount for the festival in the power consuming region based on the first output signal and the second output signal.

According to an embodiment, the power management device 400 may acquire the first output signal and the second output signal according to a control result of the neural networks, and the acquired first output signal may include festival size information having output values from five scales, and the acquired second output signal may include festival type information including a code indicating the type of festival.

For example, the size information included in the first output signal may include numerical values for five scales of small, medium-small, medium, medium-large, and large sizes based on the scale of the festival, and the type information included in the second output signal may include codes indicating types of festivals such as water, fire, light, and flowers.

Figure 4:
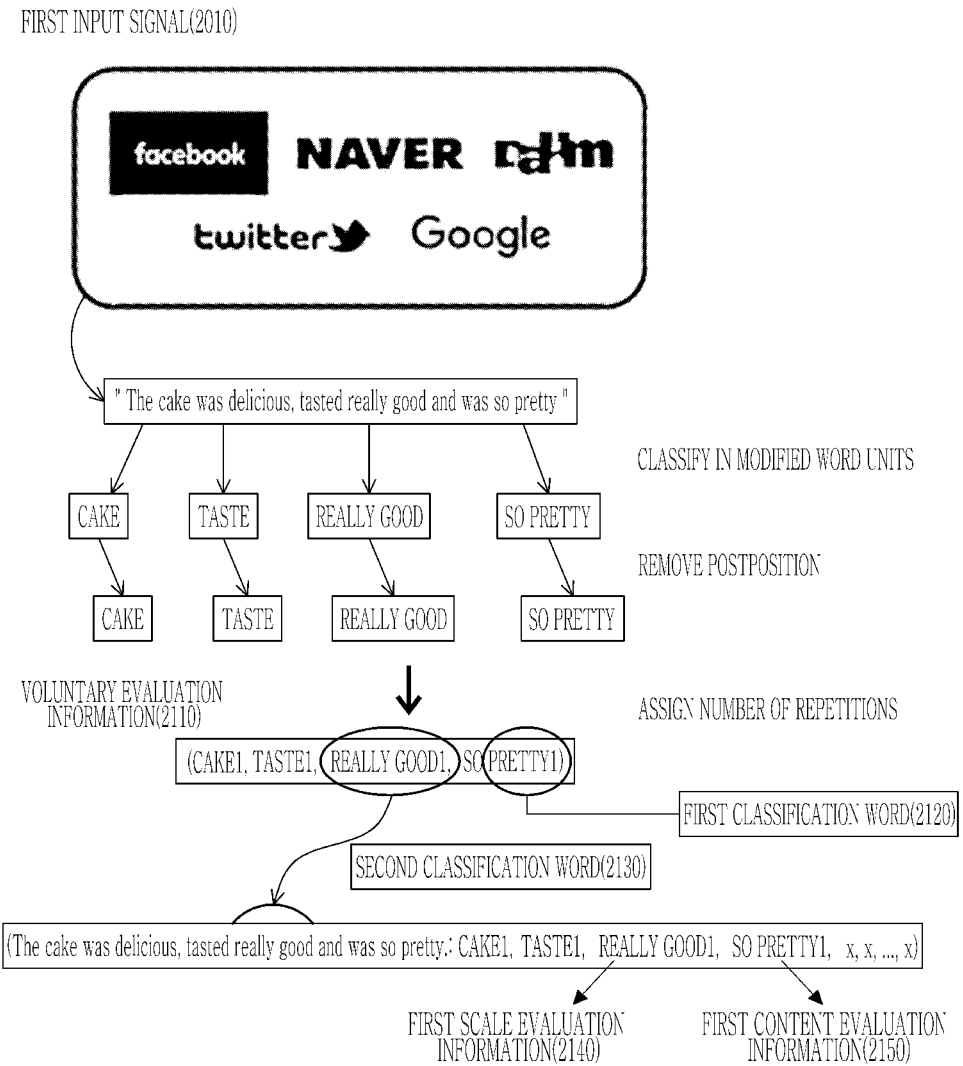
FIG. 4 is a diagram for describing a first input signal, according to an embodiment of the present invention.

FIG. 4 is a diagram for describing a first input signal, according to an embodiment of the present invention.

Referring to FIG. 4, generation of the first input signal 2010 may include a process of processing words in modified word units acquired from the voluntary evaluation information 2110 into a form suitable for the first neural network.

The first input signal 2010 according to an embodiment is a vector consisting of a total of one row and thirty columns, where the entire sentence analyzed in the voluntary evaluation information 2110 may be disposed in the first column of the first row, and then a first classification word 2120 and a second classification word 2130 may be included.

According to an embodiment, the first classification word 2120 may refer to a word with clear meaning by itself. The word with clear meaning is a word that has meaning inferable with just that word, and expressions on the scale of the festival or expressions on the content may be included therein. For example, the word with clear meaning may include 'is delicious', 'delicious and', 'delicious so', 'deliciously', 'pretty', 'pretty and', ' is pretty', and the like, but is not limited thereto.

According to an embodiment, the second classification word 2130 may refer to a word that has not clear meaning by itself and requires contextual judgment. For example, the second classification word 2130 may include expressions such as 'like' and 'not like', but is not limited thereto. For example, in the case of the sentence 'The scale is large, the content is not good', it can be seen that it is difficult to infer 'large' and 'not good' using just the words themselves. In this case, it is necessary to check the classification criterion words included before and after the corresponding word in the sentence. In the case of 'large', the word 'scale' may be the classification criterion word, and in the case of 'not good', the word 'content' may be the classification criterion word. For each classification criterion word, a word position before the corresponding word is preferentially selected; otherwise, a word that immediately follows the corresponding word may be selected as a classification criterion word of the corresponding word.

The first input signal 2010 according to an embodiment may allow the first classification word 2120 and the second classification word 2130 to be selected through the first neural network, and accordingly, the selected first classification word 2120 and the second classification word 2130 may be sorted as first scale evaluation information 2140 and first content evaluation information 2150.

The first input signal 2010 according to an embodiment may list words processed as voluntary evaluation information 2110 from the second column of the first row. Except for the first row, the remaining rows out of the thirty rows may be filled with the processed words, and 'X' marks may be entered in rows that remain after the filling, where in the first neural network, the 'X' mark is recognized as a non-input value and may not be included in the computation of the first neural network.

The power management device 400 according to an embodiment may increase customer satisfaction through a value acquired from online big data.

Figure 5:
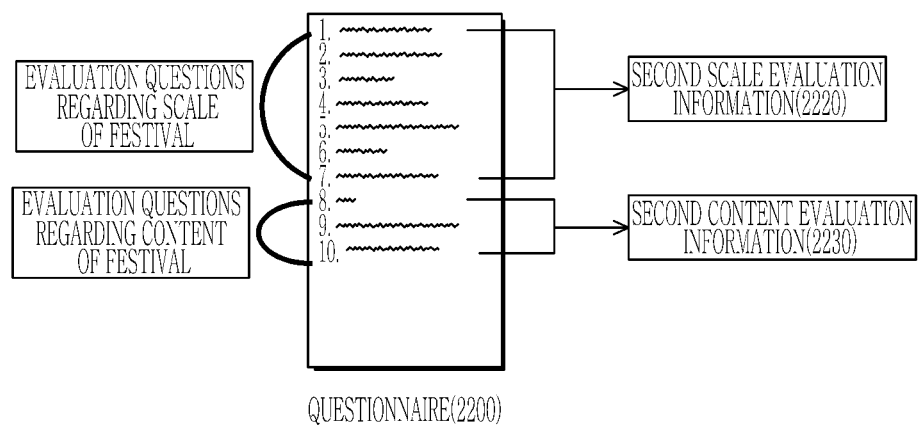
FIG. 5 is a diagram for describing a second input signal and a third input signal, according to an embodiment of the present invention.

FIG. 5 is a diagram for describing a second input signal and a third input signal, according to an embodiment of the present invention.

Referring to FIG. 5, a second input signal 2020 may use a score acquired through involuntary evaluation information 2210 from customers through a questionnaire 2200. The questionnaire includes a total of ten questions, which may include seven evaluation questions on the scale of the festival and three evaluation questions on the content of the festival. Each question may be given a total of five options, and may be composed of 'absolutely no', 'no', 'normal', 'yes', and 'very much so'. Each option may be assigned a score of 1 to 5, and the second input signal 2020 may calculate an average of scores for each category. The category may include second scale evaluation information 2220 and second content evaluation information 2230. When the second scale evaluation information 2220 and the second content evaluation information 2230 of the second input signal 2020 are collected in units of a total of 100 persons, the number of units of 100 persons generated in the second neural network and the third neural network Values may be used as an input.

According to an embodiment, the third input signal 2030 is a vector of one row and one column, and sales information 2310 may be displayed in the first column of the first row. The sales information 2310 about the festival is a value in which the amount of products sold during the actual festival period may be reflected along with the evaluation of the scale or content of the festival, and in fact, when sales are low, it may be necessary to consider changes in scale or content. Accordingly, the third input signal 2030 including the sales information 2310 may be used as an input to both the second neural network and the third neural network.

Figure 6:
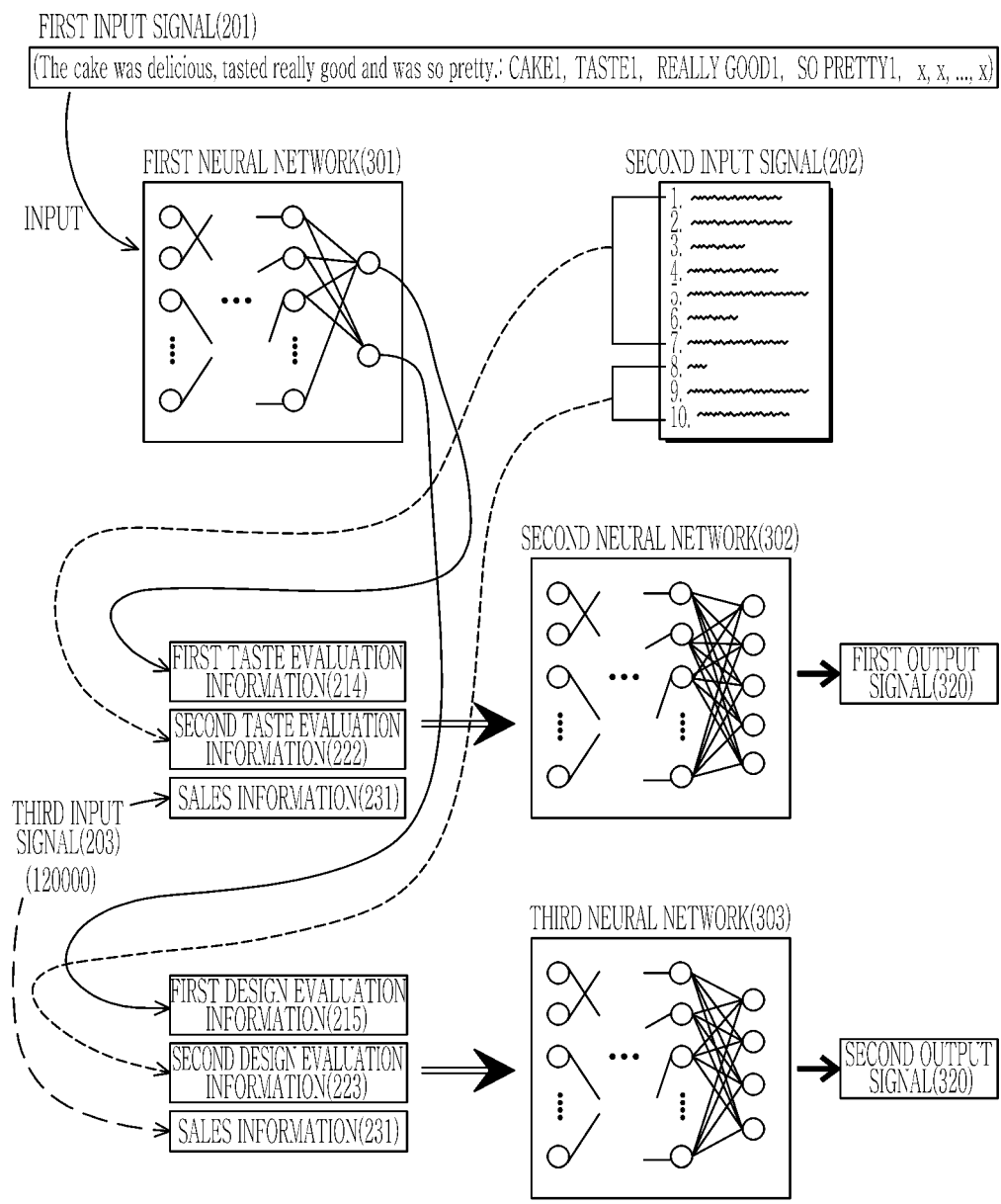
FIG. 6 is a diagram for describing neural networks, according to an embodiment of the present invention.

FIG. 6 is a diagram for describing neural networks, according to an embodiment of the present invention.

Referring to FIG. 6, the neural networks may include a first neural network 3010 using the first input signal 2010 as an input; a second neural network 3020 using, as inputs, the first scale evaluation information 2140 for the first input signal 2010 that is sorted according to classification of the first neural network 3010, the second scale evaluation information 2220 for the second input signal 2020, and the sales information 2310 for the third input signal 2030; and a third neural network 3030 using, as inputs, the first content evaluation information 2150 for the first input signal 2010 that is sorted according to the classification of the first neural network 3010, the second content evaluation information 2230 for the second input signal 2020, and the sales information 2310 for the third input signal 2030.

The first input signal 2010 according to an embodiment may be a vector of one row and thirty columns in which an existing entire sentence constituting the voluntary evaluation information 2110 is included in a first column of a first row, the first classification word 2120 implying explicit information is selected, a classification criterion word is selected as the second classification word 2130 from among words corresponding to others when the classification criterion word is included before and after the words in the entire sentence included in the first column of the first row, the first classification word 2120 and the second classification word 2130 are arranged in a second column to a 30th column, and 'X' is included in columns where the first classification word 2120 and the second classification word 2130 are not input in the thirty columns.

The first neural network 3010 according to an embodiment may classify words in the first input signal 2010 into the first scale evaluation information 2140 and the first content evaluation information 2150.

The second neural network 3020 according to an embodiment may use, as inputs, the first scale evaluation information 2140 according to the classification of the first neural network 3010, the second scale evaluation information 2220 for the second input signal 2020, and the sales information 2310 for the third input signal 2030, output the first output signal 3100 having size information for the festival as five output values according to the scale based on 1,700 input values corresponding to the respective columns, and arrange 1000 words for the first scale evaluation information 2140 in the respective columns of the vector of one row so that they are arranged in the first column to the 1000th column, when the 1000 words are collected, and the second scale evaluation information 2220 may be generated based on responses to seven questions regarding the scale of the festival from the involuntary evaluation information 2210 and may be arranged in the 1001th column to the 1700th column whenever it is collected in units of 100 persons in total.

The third neural network 3030 according to an embodiment may use, as inputs, the first content evaluation information 2150 according to the classification of the first neural network 3010, the second content evaluation information 2230 for the second input signal 2020, and the sales information 2310 for the third input signal 2030, and output the second output signal 3200 including type information regarding the festival based on 1,300 input values corresponding to respective columns, when 1000 words for the first content evaluation information 2150 are collected, the 1000 words may be arranged in respective columns of the vector of one row, the second content evaluation information 2230 may be generated based on responses to three questions regarding the content of the festival from the involuntary evaluation information 2210 and may be arranged in the 1001th column to the 1300th column whenever it is collected in units of 100 persons in total, and the type information may include a code indicating the type of the festival, and the code may be a code combined from four output values.

Neural networks according to an embodiment may have a hidden layer and an output layer. In neural networks for the method for predicting the power demand amount, there are generally five or more hidden layers, and 100 nodes of each hidden layer are designated, but may be set to more or less in some cases. As an activation function of the hidden layer, a ReLU function, a sigmoid function, and a tan h function may be used, but the activation function is not limited thereto. Nodes of the output layer of the neural networks may be different for each neural network. In the case of neural networks in the method for predicting the power demand amount, the first neural network 3010 may have 30 input nodes and 2 output nodes, the second neural network 3020 may have 1700 input nodes and 5 output nodes, and the third neural network 3030 may have 1300 input nodes and 4 output nodes.

The first neural network 3010 according to an embodiment may divide the words in the first input signal 2010 into first classification words 2120 and second classification words 2130 and generate information about each word, and may categorize each of the classification words based on the information to sort the words. When each word undergoes categorization, individual words may be sorted as the first scale evaluation information 2140 and the first content evaluation information 2150.

The second neural network 3020 according to an embodiment may use, as inputs, the first scale evaluation information 2140 according to the classification of the first neural network 3010, the second scale evaluation information 2220 for the second input signal 2020, and the sales information 2310 for the third input signal 2030.

According to an embodiment, when 1000 words for the first scale evaluation information 2140 are collected, the power management device 400 may arrange the 1000 words in respective columns of the vector of one row so that they are arranged in the first column to the 1000th column. The second scale evaluation information 2220 may be generated based on responses to seven questions about the scale of the corresponding festival in the involuntary evaluation information 2210, and may be arranged in the 1001th column to the 1700th column whenever it is collected in units of 100 persons in total.

The second neural network 3020 according to an embodiment may classify words in the first scale evaluation information 2140 into words for five scales. The second neural network 3020 may search for a method for classifying words for five scales from a database in the power management device 400 and may classify words based on pre-learned information. For example, 'small', 'large', or the like, may correspond to the classification, and the evaluation of each scale may be expressed as a numerical score.

The second neural network 3020 according to an embodiment may present a result value for modifying the scale in a direction in which the sales information 2310 is to be maximized, based on the numerical score calculated in the first scale evaluation information 2140 and the values included in the second scale evaluation information 2220. The result values are displayed through a total of five output nodes, and each output node may be a value expressing an optimal weight of small, medium-small, medium, medium-large, and large. Information including values of the five output nodes may be the size information about the festival, and the first output signal 3100 including the size information may be generated.

The third neural network 3030 according to an embodiment may use, as inputs, the first content evaluation information 2150 according to the classification of the first neural network 3010, the second content evaluation information 2230 for the second input signal 2020, and the sales information 2310 for the third input signal 2030.

According to an embodiment, when 1000 words for the first content evaluation information 2150 are collected, the power management device 400 may arrange the 1000 words in respective columns of the vector of one row so that they are arranged in the first column to the 1000th column. The second content evaluation information 2230 may be generated based on responses to three questions about the content of the corresponding festival in the involuntary evaluation information 2210, and may be arranged in the 1001th column to the 1300th column whenever it is collected in units of 100 persons in total.

The third neural network 3030 according to an embodiment may present a result value for modifying the content in a direction in which the sales information 2310 is to be maximized, based on the numerical score calculated in the first content evaluation information 2150 and the values included in the second content evaluation information 2230.

According to an embodiment, the third neural network 3030 may output the second output signal 3200 including type information of the corresponding festival based on 1300 input values corresponding to each column.

According to one embodiment, the type information includes a code indicating the type of corresponding festival, and the code may be a code combined from four output values. The third neural network 3030 may include a total of four output nodes, and each output node may indicate a value of 0 to 1 as an output, the values may be values representing codes, and the codes may include the form and organization of content for the corresponding festival according to a result of searching a database in the power management device 400.

According to an embodiment, the value of the output node of the third neural network 3030 may represent a value of 0 to 1, and codes corresponding to six values obtained by subdividing the values into six values of 0, 0.2, 0.4, 0.6, 0.8, and 1 may be registered in the database in advance, and a value closest to the value of the output node may be selected. For example, when the value of the output node is 0.48, the value is closer to 0.4 than 0.6, and thus a code corresponding to 0.4 may be selected. Since each of the four output values in the second output signal 3200 may have six corresponding codes, a combination thereof may indicate 1296 pieces of content for 64.

The above-described embodiments may be implemented by a hardware component, a software component, and/or a combination of a hardware component and a software component. For example, the apparatus, method, and components described in the exemplary embodiments may be implemented by using one or more general purpose computers or special purpose computers, for example, like a processor, controller, arithmetic logic unit (ALU), digital signal processor, microcomputer, field programmable gate array (FPGA), programmable logic unit (PLU), microprocessor, or any other device capable of executing and responding to instructions. The processing device may execute an operating system (OS) and one or more software applications executed on the operating system. Further, the processing device may also access, store, manipulate, process, and generate data in response to execution of the software. For convenience of understanding, in some cases, one processing device is described as being used, but it will be apparent to those skilled in the art that the processing device includes a plurality of processing elements and/or a plurality of types of processing elements. For example, the processing device may include a plurality of processors or one processor and one controller. Other processing configurations are also possible, such as parallel processors.

The methods in accordance with exemplary embodiments may be implemented in the form of program instructions that may be executed by various computer means and recorded in a computer-readable medium. The computer-readable medium may include program instructions, a data file, a data structure, or the like alone or in combination. The program instructions recorded on the medium may be specially designed and configured for the exemplary embodiments, or may be known and available to those skilled in the art of computer software. Examples of the computer-readable recording medium include magnetic media such as hard disks, floppy disks, and magnetic tapes, optical media such as CD-ROMs and DVDs, magneto-optical media such as floptical disks, a hardware device specially configured to store and execute program instructions, such as ROM, RAM, flash memory, or the like. Examples of the program instruction includes not only machine language codes such as those produced by a compiler, but also high-level language codes that can be executed by a computer using an interpreter or the like. The hardware device may be configured to operate as one or more software modules to perform operations of exemplary embodiments, and vice versa.

Software may include a computer program, code, instructions, or one or more combinations thereof, for independently or collectively instructing or configuring the processing device to operate as desired. Software and/or data may be permanently or temporarily embodied in any type of machine, component, physical or virtual equipment, computer storage medium or device, or in a propagated signal wave in order to be interpreted by the processing device or provide instructions or data to the processing device. Software may be distributed over network coupled computer systems so that the software is stored and executed in a distributed manner. Software and data may be stored in one or more computer-readable recording media.

Although the exemplary embodiments have been described with reference to the limited drawings as described above, those skilled in the art may apply various technical modifications and variations based on the above. For example, even if the described techniques are performed in an order different from the described method, and/or the components of the described system, structure, apparatus, circuit, or the like are coupled or combined in a different form from the described manner, or supplemented or substituted by other components or equivalents, suitable results may be achieved.

Therefore, other implementations, other embodiments, and equivalents of the claims are within the scope of the following claims.

The invention claimed is:

1. A method for managing charging and discharging of an energy storage system (ESS) group for voltage stabilization of a grid having a distributed resource connected thereto in a power management device, the method comprising:
measuring a voltage and current amount of the grid to which the distributed resource is connected;
performing control so that a voltage of the grid to which the distributed resource is connected is reduced through charging of an ESS group to be charged, by determining that a plurality of ESSs connected to a power distribution line are required to be charged when it is confirmed that the voltage and current amount of the grid to which the distributed resource is connected are greater than a preset reference voltage and current amount, calculating a required charge amount through a difference between the voltage and current amount of the grid to which the distributed resource is connected and the reference voltage and current amount, checking a chargeable capacity for each of ESS groups in which the plurality of ESSs are classified according to a preset condition, selecting the ESS group to be charged from among the ESS groups based on the required charge amount and the chargeable capacity for each ESS group, and transmitting a charging command for the required charge amount to the ESS group to be charged;
performing control so that the voltage of the grid to which the distributed resource is connected is increased through charging of an ESS group to be discharged, by determining that the plurality of ESSs are required to be discharged when it is confirmed that the voltage and current amount of the grid to which the distributed resource is connected are smaller than the reference voltage and current amount, calculating a required discharge amount through the difference between the voltage and current amount of the grid to which the distributed resource is connected and the reference voltage and current amount, checking a dischargeable capacity for each of the ESS groups, selecting the ESS group to be discharged from among the ESS groups based on the required discharge amount and the dischargeable capacity for each ESS group, and transmitting a discharging command for the required discharge amount to the ESS group to be discharged;

calculating a voltage control amount through a charge amount and a discharge amount for each ESS group when the voltage of the grid to which the distributed resource is connected is stabilized by charging and discharging the plurality of ESSs; and providing a performance incentive for voltage stabilization to the ESS group in which it is confirmed that the voltage control amount is greater than or equal to a reference value according to the voltage control amount and providing a maintenance incentive for standby in an emergency situation to an ESS group in which it is confirmed that the voltage control amount is less than the reference value, wherein the calculating of the voltage control amount includes:

setting a first weight according to a magnitude of the difference between the voltage and current amount of the grid to which the distributed resource is connected and the reference voltage and current amount, the difference being checked at a time of charging and discharging;

setting a second weight according to a sum of the chargeable capacity and dischargeable capacity for each ESS group, the chargeable capacity and the dischargeable capacity being checked at the time of charging and discharging; and calculating the voltage control amount by applying the first weight and the second weight to the charge amount and discharge amount of the ESS group, wherein the method for managing charging and discharging of the ESS group further comprises:

predicting a power supply amount through a sum of power generation amounts obtained by collecting meteorological data for a power supply region where the distributed resource is located and calculating a power generation amount for the distributed resource based on the meteorological data;

predicting a power demand amount based on power use data and the meteorological data, the power use data being collected by weather in a power consuming region where a load connected to the power distribution line is located;

evaluating stabilization of power supply and demand by comparing the predicted power supply amount and the predicted power demand amount; and determining a number of ESS groups to be set as participants for voltage stabilization of the grid to which the distributed resource is connected from among the plurality of ESSs, according to a result of the evaluating of the stabilization of power supply and demand, and wherein the predicting the power demand amount comprises:

acquiring voluntary evaluation information, involuntary evaluation information, and sales information about a festival in the power consuming region from users related to the festival within a predetermined period of time;

generating a first input signal based on the voluntary evaluation information, generating a second input signal based on the involuntary evaluation information, and generating a third input signal based on the sales information;

inputting the first input signal, the second input signal, and the third input signal to previously trained neural networks;

acquiring a first output signal and a second output signal based on a result of the inputting to the neural networks; and predicting the power demand amount for the festival in the power consuming region based on the first output signal and the second output signal, the neural networks comprising:

a first neural network using the first input signal as an input;

a second neural network using, as inputs, first scale evaluation information for the first input signal that is sorted according to classification of the first neural network, second scale evaluation information for the second input signal, and the sales information for the third input signal; and a third neural network using, as inputs, first content evaluation information for the first input signal that is sorted according to the classification of the first neural network, second content evaluation information for the second input signal, and the sales information for the third input signal, the first input signal may be a vector of one row and thirty columns in which an existing entire sentence constituting the voluntary evaluation information is included in a first column of a first row, a first classification word implying explicit information is selected, a classification criterion word is selected as a second classification word from among words corresponding to others when the classification criterion word is included before and after the words in the entire sentence included in the first column of the first row, the first classification word and the second classification word are arranged in a second column to a 30th column, and 'X' is included in columns where the first classification word and the second classification word are not input in the thirty columns, and the first neural network may classify words in the first input signal into the first scale evaluation information and the first content evaluation information.

\* \* \* \* \*